Dec. 15, 1925.

R. W. HARTY

TUBE SPLICING DEVICE

Filed Dec. 11, 1920

1,566,090

Inventor
Ray W. Harty
By Robert M. Pierson
Atty.

Patented Dec. 15, 1925.

1,566,090

UNITED STATES PATENT OFFICE.

RAY W. HARTY, OF AKRON, OHIO, ASSIGNOR TO THE B. F. GOODRICH COMPANY, OF NEW YORK, N. Y., A CORPORATION OF NEW YORK.

TUBE-SPLICING DEVICE.

Application filed December 11, 1920. Serial No. 429,905.

*To all whom it may concern:*

Be it known that I, RAY W. HARTY, a citizen of the United States, residing at Akron, in the county of Summit and State of Ohio, have invented a certain new and useful Tube-Splicing Device, of which the following is a specification.

This invention relates to the art of splicing tubes formed of flexible material such as rubber, a familiar example being the joining of the ends of a length of vulcanized rubber tubing to form an annular inner tube for pneumatic tires. The tube for small and medium sized tires usually is vulcanized in straight cylindrical form and thereafter its ends are brought together and joined in an annular lapped seam by cementing or vulcanizing.

The object of my invention is to provide improved means for bringing the two tube ends into proper telescoped relation without injury to the material of which the tube is constructed and thus to facilitate the work and reduce the amount of damaged stock.

Figure 1:
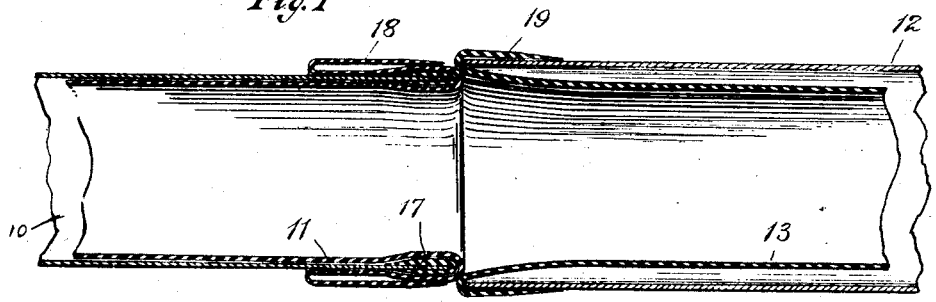
Fig. 1 is a longitudinal section of a tube-splicing sleeve embodying a preferred form of my invention, showing a tube thereon in position for splicing.
Figure 2:
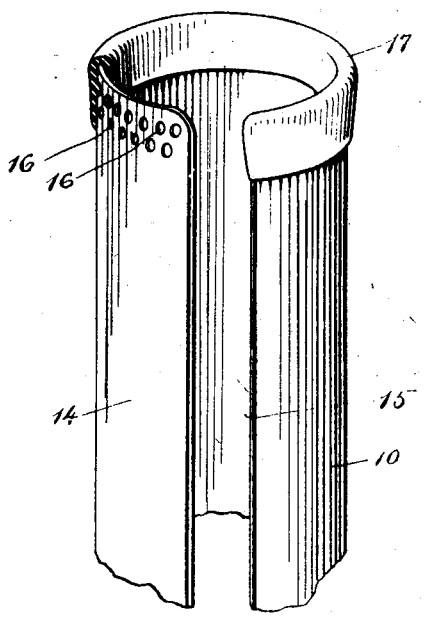
Fig. 2 is a perspective view of the sleeve, partly cut away to show the relation of its parts.

Referring to the drawings:

10 represents generally a tube-splicing sleeve, and 11 is one end portion of a tube mounted thereon in position for splicing. 12 is a generally similar but slightly larger sleeve adapted to cooperate with the first-mentioned sleeve in the splicing operation, and 13 is the other end portion of a tube in proper relation to the sleeve 12 to be introduced to the end portion 11.

The sleeve 10 comprises a body portion 14 which may be formed of rigid material such as metal, fiber composition, hard rubber or other form-retaining material, said body portion being of generally cylindrical form but having a longitudinal cut 15 through one side thereof and a circumferential series of perforations 16 through its wall at the front end. 17 is a soft rubber casing or bumper of open annular form, and roughly U-shaped in cross section, embracing or enveloping the end margin of said body member, the two sides of the U being joined through the several perforations 16 and across the ends of the edges formed by the horizontal cut 15 by riveting portions of rubber integral with the bumper 17, which thus forms an integral pad of rubber for the end edge and the adjacent inner and outer margins of said body member 14, said pad being firmly secured in place. The bumper or pad 17 preferably is simultaneously formed and secured to the body member 14 by being vulcanized thereon in a suitable mold under sufficient pressure to cause the rubber to flow into the perforations 16 during vulcanization and thus firmly secure the pad of rubber upon the said body member 14.

In the use of the device, the end portion of the tube 11 is laid longitudinally in the sleeve 10 through the cut 15 with the end of the tube extending somewhat beyond the pad 17. Said end of the tube is then folded backward upon the outside of the sleeve and then turned forward again upon itself as shown at 18 in Fig. 1. The tube end 13 to which the end 11 is to be spliced is laid in the sleeve 12 and folded back upon the outside thereof as shown at 19 in Fig. 1, and the two sleeves with the tube ends thus associated therewith are brought together as shown in Fig. 1. A cement, preferably of the quick-curing variety, is then applied to the exposed outer surface of one or both of the tube ends 18, 19, and the end 19 is folded over the end 18, forming an annular lapped seam therewith.

The sleeves are then drawn apart to straighten out the fold of the tube end 11 and the tubes are then removed from the sleeves through the longitudinal cuts therein.

If desired, the co-operating sleeve 12 may also be provided with a pad such as that described, but I find that with only one of the sleeves so constructed injury to the walls of the tube resulting from the striking of the sleeve ends as they are brought together is substantially avoided, the rubber pad 17 serving to absorb the shock.

I claim:

1. A sleeve for splicing tubes comprising a metallic body member of generally cylindrical form with a longitudinal cut through one side thereof and an end member of soft rubber secured to said body member.

2. A sleeve for splicing tubes comprising a substantially rigid body member of generally cylindrical form having a longitudinal cut through one side thereof and a circumferential series of perforations through an end margin thereof, and a soft rubber member enveloping the end edge of said body member and secured thereto by integral portions of rubber extending through said perforations.

3. A tube-splicing device comprising a longitudinally-split sleeve having a resilient pad secured to an end thereof.

In witness whereof I have hereunto set my hand this 1st day of December 1920.

RAY W. HARTY.